US010298061B2

(12) United States Patent
Mastrandrea

(10) Patent No.: US 10,298,061 B2
(45) Date of Patent: May 21, 2019

(54) WIRELESS VEHICLE RECHARGING SYSTEM

(71) Applicant: Thunder Power New Energy Vehicle Development Company Limited, Central (HK)

(72) Inventor: Francesco Mastrandrea, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/675,570

(22) Filed: Aug. 11, 2017

(65) Prior Publication Data

US 2018/0069431 A1 Mar. 8, 2018

Related U.S. Application Data

(60) Provisional application No. 62/384,298, filed on Sep. 7, 2016.

(51) Int. Cl.
| | |
|---|---|
| *H02J 7/02* | (2016.01) |
| *H02J 50/10* | (2016.01) |
| *H01M 10/625* | (2014.01) |
| *H02J 50/20* | (2016.01) |
| *B60L 11/18* | (2006.01) |

(Continued)

(52) U.S. Cl.
CPC ........... *H02J 50/10* (2016.02); *B60L 11/1816* (2013.01); *B60L 11/1829* (2013.01); *B60L 11/1833* (2013.01); *H01M 10/625* (2015.04); *H02J 7/0027* (2013.01); *H02J 50/20* (2016.02); *H02J 50/90* (2016.02); *H01M 2220/20* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ........ H01M 10/625; H02J 50/10; H02J 50/20; B60L 11/1816
USPC ......................................... 320/104, 108, 109
See application file for complete search history.

(56) References Cited

U.S. PATENT DOCUMENTS

| | | | | |
|---|---|---|---|---|
| 2011/0254503 | A1* | 10/2011 | Widmer | ................ B60L 11/182 320/108 |
| 2015/0151641 | A1* | 6/2015 | Berger | ................ B60L 11/1833 320/108 |

(Continued)

FOREIGN PATENT DOCUMENTS

WO    2011/116394 A1    9/2011

OTHER PUBLICATIONS

European Search Report for EP 17189812 dated Jan. 25, 2018, 7 pages.

*Primary Examiner* — Edward Tso
*Assistant Examiner* — Aaron Piggush
(74) *Attorney, Agent, or Firm* — Kilpatrick Townsend & Stockton LLP

(57) ABSTRACT

A vehicle including a wireless vehicle recharging system which includes a receiver coupled to the vehicle and configured to receive electrical power through electromagnetic induction from a transmitter, an alignment system including a controller configured to autonomously align the receiver with the transmitter, and a first sensor configured to provide a first signal to the controller. The controller uses the first signal from the first sensor to control a position of the vehicle to align the receiver with the transmitter.

20 Claims, 3 Drawing Sheets

(51) Int. Cl.
*H02J 7/00* (2006.01)
*H02J 50/90* (2016.01)

(56) References Cited

U.S. PATENT DOCUMENTS

| | | |
|---|---|---|
| 2015/0343916 A1* | 12/2015 | Kim .................... B60L 11/1835 |
| | | 701/22 |
| 2016/0059723 A1 | 3/2016 | Kim et al. |
| 2016/0229304 A1 | 8/2016 | Bildstein et al. |
| 2017/0008409 A1* | 1/2017 | Roberts ............... B60L 11/1829 |
| 2017/0120765 A1* | 5/2017 | Ichikawa ............ B60L 11/1825 |
| 2017/0136902 A1* | 5/2017 | Ricci ................... B60L 11/1825 |

* cited by examiner

WIRELESS VEHICLE RECHARGING SYSTEM

PRIORITY CLAIM

This Application claims priority to U.S. Provisional Application No. 62/384,298, entitled ELECTRIC VEHICLE COMPONENTS, filed on Sep. 7, 2016, in its entirety.

FIELD OF THE INVENTION

The disclosure generally relates to a recharging system.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electric vehicles are growing in popularity as society becomes more and more concerned about carbon emissions and sustainable/renewable energy sources. Electric vehicles operate using electric power stored in one or more rechargeable batteries. During operation, the stored electrical energy is controllably released to drive an electric motor. The electric motor converts the electrical energy into mechanical energy, which propels the vehicle. As the electric vehicle operates, the battery loses electrical power and must be connected to a power source for recharging.

SUMMARY OF THE INVENTION

Electric vehicles are powered with a battery that provides power to electric motors that then propel the vehicle. The battery may also power various onboard systems such as displays, climate control systems, speakers, radios, etc. To recharge the battery or batteries, the electric vehicle includes a wireless vehicle recharging system. The wireless vehicle recharging system charges the battery through electromagnetic induction by transferring power from a transmitter to a receiver using electromagnetic fields. The receiver may be positioned at any location on the vehicle capable of interaction with a transmitter. The wireless vehicle recharging system may include an alignment system that aligns the receiver with the transmitter. In some embodiments, the alignment system may be capable of autonomously moving the vehicle and/or assist a driver in aligning the receiver with the transmitter. For example, the alignment system may include a controller that receives signals from one or more sensors that indicate the location of the transmitter. Using this information, the controller controls the electric motor(s) and the vehicle's steering system to align the receiver with the transmitter. In some embodiments, the wireless vehicle recharging system may assist a driver in positioning the vehicle through sensors that provide information to the driver (e.g., information on a display). In this way, a driver may look at the display and receive feedback on how to align the receiver with the transmitter.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
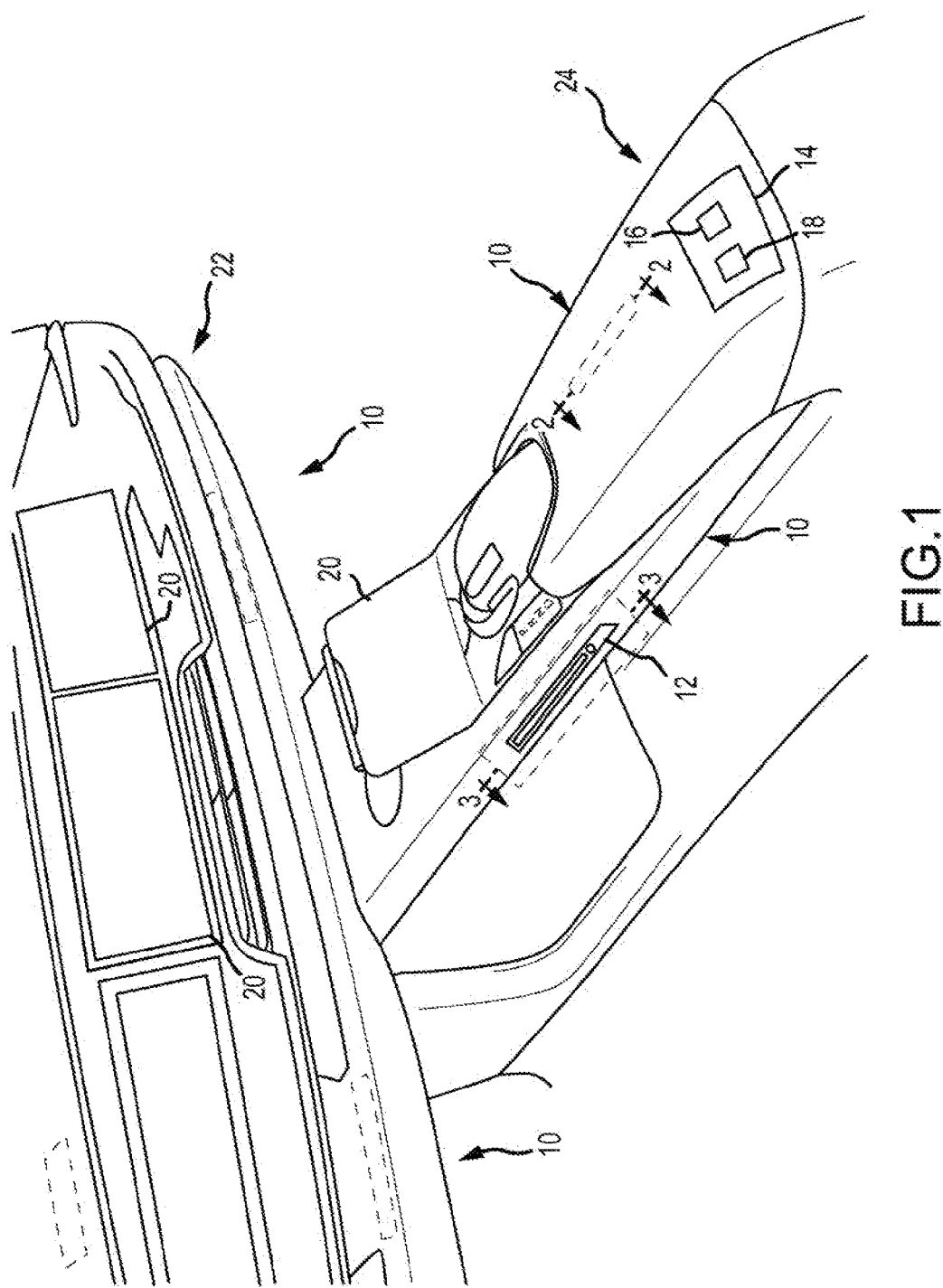
FIG. 1 is a perspective view of an embodiment of a vehicle and a wireless vehicle recharging system.
Figure 2:
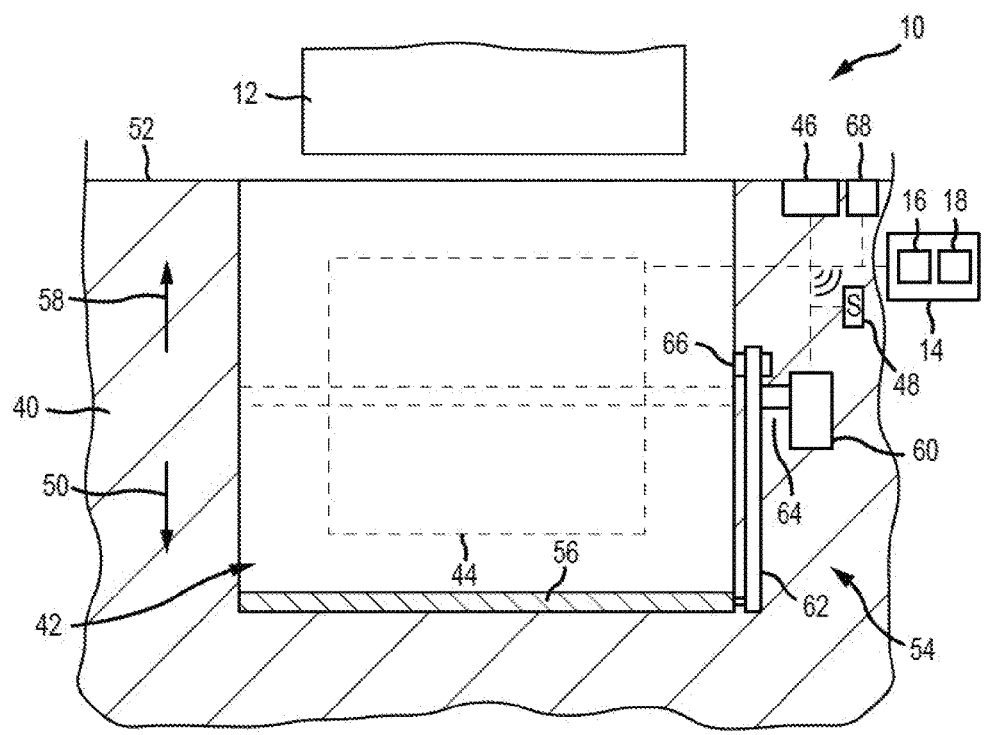
FIG. 2 is a side view of an embodiment of a vehicle and a wireless vehicle recharging system.
Figure 3:
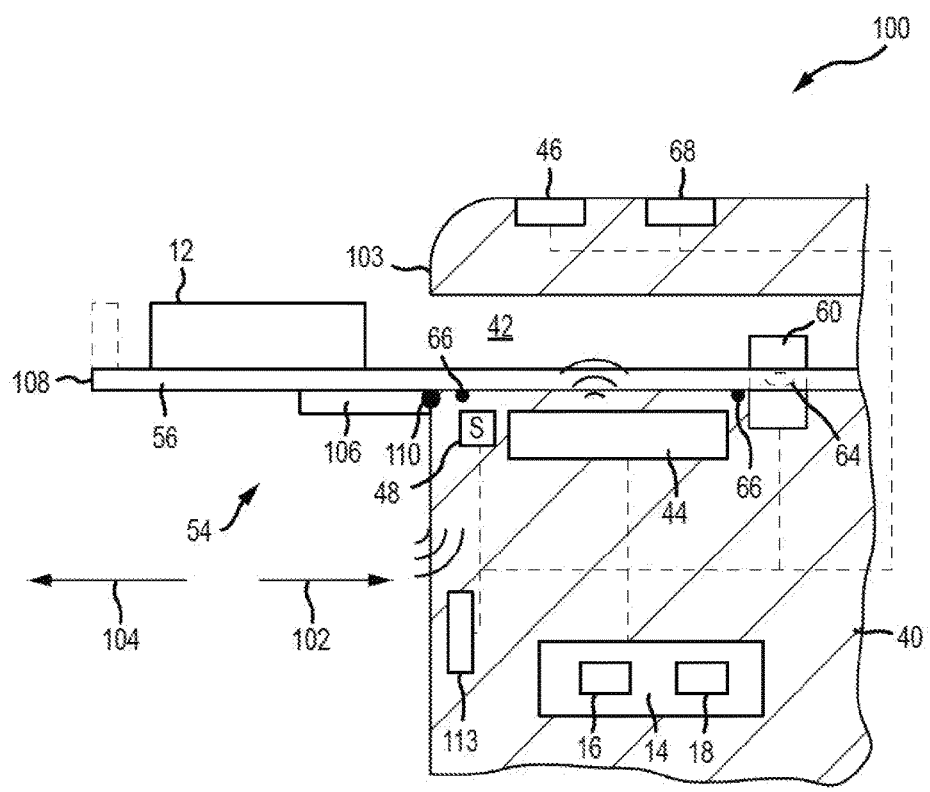
FIG. 3 is a rear view of an embodiment of a vehicle and a wireless vehicle recharging system.

FIG. 1 is a perspective view of an embodiment of a vehicle 2 and a wireless vehicle recharging system 4. The wireless vehicle recharging system 4 enables wireless recharging of one or more vehicle batteries 6. In other words, the vehicle 2 may not be coupled through wires and plugs to a power source for recharging. The wireless vehicle recharging system 4 includes one or more receivers 8 on the vehicle 2 that interact with one or more transmitters 10 (e.g., magnetic field generators). The receivers 8 may be located at various positions on the vehicle 2 including underneath the vehicle 2, sides 12 of the vehicle 2 (e.g., in the doors); rear 14 of the vehicle 2, front 16 of the vehicle 2, and/or the top of the vehicle 18. Positioning the receivers at various locations on the vehicle, enables the vehicle 2 to receive power at various locations and from different transmitters (e.g., recharging stations, home, etc.). While a car is illustrated in FIGS. 1-3, it should be understood that the term vehicle may include cars, trucks, boats, airplanes motorcycles, ATVs, buses, etc.

Power may flow from the transmitters 10 to the receivers 8 through electromagnetic induction when the two are proximate to one another (e.g., within 20 cm). In some embodiments, substantially aligning the transmitters 10 with the receivers 8 may also facilitate power transfer (e.g., efficient energy transfer). However, the driver may be unable to see the location of the transmitter 10 over the front of the car and/or dashboard. In other words, without assistance the driver may struggle to align one or more receivers 8 with one or more transmitters 10 for recharging the battery 6. Accordingly, the wireless vehicle recharging system 4 may include an alignment system 20 that facilitates alignment of the one or more receivers 8 with one or more transmitters 10.

The alignment system 20 includes one or more sensors 22 (e.g., cameras, signal receivers, GPS, proximity sensors, radar, etc.). All of the sensors 22 may be the same type of sensor or the vehicle 2 may include different types of sensors 22. By including different types of sensors 22 the alignment system 20 enables cross-referencing to verify the position of one or more transmitters 10 as well as facilitate operation when one or more types of sensors is degraded by operating conditions. For example, visual sensors (e.g., cameras) may struggle in some weather conditions. In these situations, the alignment system 20 may rely on other sensors 22 (e.g., GPS, proximity sensors, etc.) that remain unaffected by various weather conditions. In operation, the sensors 22 may enable autonomously alignment of the vehicle 2 and/or assist a driver in aligning the vehicle 2 with the transmitter(s) 10.

In an autonomous alignment situation, the driver may drive the vehicle 2 within a specific/threshold distance (e.g., 50 meters) of the transmitter 10. Once inside this distance, the driver may push a button, issue an audio command, touch a display 24 (e.g., touchscreen), push a button on a key fob (e.g., when outside of the vehicle 2), etc. that turns control of the vehicle 2 over to the controller 26 (e.g., vehicle computer). The controller 26 then uses one or more processors 28 to execute instructions stored on one or more memories 30 to control the vehicle motor(s), steering system, and braking system to align the receiver(s) 8 with the transmitter(s) 10. The controller 26 controls movement of the vehicle 2 in response to feedback from one or more sensors 22. For example, one or more cameras on the vehicle 2 may detect the transmitter 10. The controller 26 may use feedback from the cameras to determine the distance and position of the transmitter 10 with respect to the receiver 8 and then adjusts the position of the vehicle 2 to align the transmitter 10 with the receiver 8. In some embodiments, the controller 26 may receive a GPS location from a user through a touchscreen, a mobile device, etc., that provides the location of the transmitter 10. The controller 26 then uses a sensor 22 (e.g., GPS sensor) to move the vehicle 2 into alignment with the transmitter 10.

In some embodiments, the transmitter 10 may broadcast a signal using one or more signal transmitters 32 to facilitate alignment. The signals emitted from the signal transmitters 32 are detected by one or more sensors 22 on the vehicle 2. The controller 26 determines the strength of the signals and uses this information to control movement of the vehicle 2. For example, if the signal is faint then the controller 26 progressively moves the vehicle 2 to increase the strength of the signal. The controller 26 then uses this information to align signal transmitters 32 coupled to or proximate to the transmitter 10 with the corresponding sensors 22 on the vehicle 2. In this way, the controller 26 is able to control movement of the vehicle 2 for alignment of the receiver 8 with the transmitter 10. In some embodiments, the transmitter 10 may include four signal/location transmitters 32 (one at each corner of the transmitter 10). Each of these signal transmitters 32 may emit a specific signal detectable by corresponding sensors 22 on the vehicle 2 (e.g., sensors 22 located at the corresponding corner of the receiver 8). The different signals transmitted by the signal transmitters 32 enables the controller 26 to understand where each of the sensors 22 are with respect to each of the signal transmitters 32 and thus facilitate alignment of the vehicle 2 for recharging.

In some embodiments, the controller 26 detects an alignment sign(s) 34, post(s) 34, etc. using visual sensors 22. Once detected by the sensors 22, the controller 26 is able to determine how to move the vehicle 2 with respect to the sign(s)/post(s) 34 to align the receiver 8 with the transmitter 10. That is the controller 26 may include instructions in the memory 30 that contain location information about where the transmitter 10 is located with respect to the sign(s)/post(s) 34. Accordingly, when the controller 26 detects the sign(s)/post(s) 34, the controller 26 is able to determine the position of the vehicle 2 with respect to the transmitter 10 and thus maneuver the vehicle 2 into position for recharging the battery 6.

The sensors 22 may also enable a user to align (i.e., drive) the vehicle 2 with the transmitter 10. For example, visual sensors 22 may be placed underneath the vehicle 2 and provide the driver a visual image below the vehicle 2. This image may be projected onto the display 24. In some embodiments, the controller 26 may include lines, colors, etc. onto the display 24 in addition to the image to facilitate alignment. By looking at the display 24, the driver's is able to maneuver the vehicle 2 into a position that aligns the receiver 8 with the transmitter 10. As the user aligns the vehicle 2, the controller 26 may also provide feedback to the driver to facilitate alignment. For example, the controller 26 may couple to a vehicle audio system to provide audio commands such as "Move forward," "Move backward," "Turn to the left," "Turn to the right," "Stop. You're aligned," etc. The controller 26 may also provide audio tones indicating alignment or misalignment, as well as tones in combination with other audio commands. In some embodiments, the controller 26 may control interior lights (e.g., cabin lights, lights on the dashboard, etc. in response to alignment and/or misalignment of the receiver 8 with the transmitter 10.

FIG. 2 is a side view of an embodiment of a vehicle 2 and a wireless vehicle recharging system 4. Once aligned, the driver and/or controller 26 may activate the transmitter 10 to begin transferring power to the vehicle 2 through electromagnetic induction. For example, after alignment of the receiver 8 with the transmitter 10, the driver may push a button (e.g., touchscreen button) which sends a signal indicating that the vehicle 2 is ready to begin charging. The signal may be detected by a sensor 50 and passed to a controller 52 of the wireless vehicle recharging system 4. The controller 52 includes one or more processors 54 that execute instructions stored on one or more memories 56 to control the release of power to the transmitter 10. In some embodiments, the controller 26 on the vehicle 2 may automatically send a signal to the controller 52 once the receiver 8 and transmitter 10 align. In some embodiments, the controller 52 may also verify alignment of the receiver 8 and transmitter 10 before releasing power to the transmitter 10, and/or tell the controller 26 that the transmitter 10 and receiver 8 are aligned and ready to exchange power. In some embodiments, the controller 26 may automatically send the signal to the controller 52 if the battery 6 is below a threshold power level (e.g., 50%, 35%, 25%, etc.). However, if the battery power is above a threshold level, the controller 26 may request that the driver decide whether to charge the battery 6 (e.g., request input through lights; audio requests; and/or images/messages on the display 24).

Depending on the distance 58 between the transmitter 10 and the receiver 8, the controller 52 may raise the transmitter 10 to facilitate power transfer. For example, a proximity sensor 60 may couple to the controller 52 and provide feedback indicative of the distance between the vehicle 2/receiver 8 and the transmitter 10. If the distance 58 to the sensor 50 is greater than a threshold distance (e.g., 20 cm), the controller 52 sends a signal to a motor 62 to lift the transmitter 10 in direction 64. After charging, the controller 52 then signals the motor 62 to lower the transmitter 10. The controller 52 may be told that charging is complete automatically by the controller 26 or by driver input (e.g., when the driver needs to leave). For example, if the driver starts the vehicle 2, places the vehicle into drive, etc. the controller 26 sends a signal to the controller 52 to lower the transmitter 10. The driver may also manually send the signal by pushing a button.

FIG. 3 is a rear view of an embodiment of a vehicle 2 and a wireless vehicle recharging system 4. As illustrated, the vehicle 2 may include receivers 8 on its sides (e.g., doors, etc.) to enable energy transfer with transmitters 10 placed in walls, on posts, etc. In order to exchange power with transmitters 10 in these locations the vehicle 2 may include receivers 8 on one or more vehicle sides. Similar to the discussion above, the driver, controller 26, etc. may activate the transmitter 10 to begin transferring power to the vehicle 2 through electromagnetic induction. For example, after alignment of the receiver 8 with the transmitter 10, the driver may push a button (e.g., touchscreen button) which sends a signal indicating that the vehicle 2 is ready to begin charging. The signal may be detected by a sensor 50 and passed to a controller 52 of the wireless vehicle recharging system 4. The controller 52 includes one or more processors 54 that execute instructions stored on one or more memories 56 to control the release of power to the transmitter 10 after receiving the signal. In some embodiments, the controller 26 on the vehicle 2 may automatically send a signal to the controller 52 once the receiver 8 and transmitter 10 align. In some embodiments, the controller 52 may also verify alignment of the receiver 8 and transmitter 10 before releasing power to the transmitter 10, and/or tell the controller 26 that the transmitter 10 and receiver 8 are aligned and ready to exchange power. In some embodiments, the controller 26 may automatically send the signal to the controller 52 if the battery 6 is below a threshold power level (e.g., 50%, 35%, 25%, etc.). However, if the battery power is above a threshold level, the controller 26 may request that the driver decide whether to charge the battery 6 (e.g., request input through lights; audio requests; and/or images/messages on the display 24).

Depending on the distance 58 between the transmitter 10 and the receiver 8, the controller 52 may extend the transmitter 10 to facilitate power transfer. For example, a proximity sensor 60 may couple to the controller 52 and provide feedback indicative of the distance between the vehicle 2/receiver 8 and the transmitter 10. If the distance 58 to the sensor 50 is greater than a threshold distance (e.g., 20 cm), the controller 52 sends a signal to a motor 62 to extend the transmitter 10 in direction 90. After charging, the controller 52 signals the motor 62 to retract the transmitter 10 in direction 92. The controller 52 may be automatically told that charging is complete by the controller 26 or by driver input (e.g., when the driver needs to leave). For example, if the driver starts the vehicle 2, places the vehicle into drive, etc. the controller 26 sends a signal to the controller 52 to retract the transmitter 10. The driver may also manually send the signal by pushing a button.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

What is claimed is:

1. A vehicle, comprising:
   a battery;
   a wireless vehicle recharging system, comprising:
   a receiver coupled to the vehicle and configured to receive electrical power through electromagnetic induction from a transmitter; and
   an alignment system, comprising:
      a controller configured to autonomously align the receiver with the transmitter;
      a first sensor configured to provide a first signal to the controller, wherein the first signal indicates an alignment of the receiver with the transmitter; and
   wherein the controller is configured to, in response to the first signal, move the vehicle to cause a change in the alignment of the receiver with the transmitter, wherein the controller is configured to, in response to the first signal indicating a minimum alignment of the receiver with the transmitter:
      if the battery power of the battery is below a threshold level, automatically activate the transmitter to charge the battery, and
      if the battery power of the battery is above the threshold level, prompt for an input indicating whether to activate the transmitter to charge the battery.

2. The vehicle of claim 1, wherein the first sensor comprises a camera.

3. The vehicle of claim 1, comprising a second sensor configured to provide a second signal wherein the controller uses the second signal from the second sensor to control the position of the vehicle to align the receiver with the transmitter.

4. The vehicle of claim 1, wherein the receiver is positioned underneath the vehicle.

5. The vehicle of claim 1, wherein the receiver is positioned on a side of the vehicle.

6. The vehicle of claim 3, wherein the controller is configured to cross-reference the first signal from the first sensor with the second signal from the second sensor to control the position of the vehicle to align the receiver with the transmitter.

7. The vehicle of claim 3, wherein the first and second sensors couple to the receiver, wherein the first and second sensors are configured to receive different signals from the transmitter, and wherein the controller uses the different signals from the transmitter to control the position of the vehicle to align the receiver with the transmitter.

8. A wireless vehicle recharging system, comprising;
   a receiver configured to couple to a vehicle and to receive electrical power through electromagnetic induction from a transmitter; and
   an alignment system, comprising:
      a controller configured to control alignment of the receiver with the transmitter; and
      a first sensor configured to provide a first signal to the controller, wherein the first signal is indicative of a location of the transmitter with respect to the receiver; and
      a display coupled to the controller, wherein the display is configured to display information related to the location of the transmitter to indicate alignment of the receiver with the transmitter,
      wherein the controller is further configured to, in response to the first signal indicating a minimum alignment of the receiver with the transmitter:

if the battery power of the battery is below a threshold level, automatically activate the transmitter to charge a battery of the vehicle, and if the battery power of the battery is above the threshold level, using the display, prompt for an input indicating whether to activate the transmitter to charge the battery.

9. The system of claim 8, wherein the first sensor comprises a camera.

10. The system of claim 8, comprising a second sensor configured to provide a second signal, wherein the second signal is indicative of the location of the transmitter.

11. The system of claim 8, wherein the receiver is positioned underneath the vehicle.

12. The system of claim 8, wherein the receiver is positioned on a side of the vehicle.

13. The system of claim 10, wherein the controller is configured to cross-reference the first signal from the first sensor with the second signal from the second sensor to verify the location of the transmitter.

14. The system of claim 10, wherein the first and second sensors couple to the receiver, wherein the first and second sensors are configured to receive different signals from the transmitter, and wherein the controller uses the different signals to determine the location of the transmitter.

15. A wireless vehicle recharging system, comprising;
a transmitter configured to transfer power through electromagnetic induction;
a receiver configured to couple to a vehicle and to receive electrical power from the transmitter; and
an alignment system, comprising:
a first controller configured to control alignment of the receiver with the transmitter by moving the vehicle; and
a first sensor configured to provide a first signal to the first controller wherein the first signal is indicative of a location of the transmitter with respect to the receiver,
wherein the first controller is configured to, in response to the first signal, move the vehicle to cause a change in the alignment of the receiver with the transmitter, and
wherein the alignment system is configured to, in response to the first signal indicating a minimum alignment of the receiver with the transmitter
if the battery power of the battery is below a threshold level, automatically activate the transmitter to charge a battery of the vehicle and
if the battery power of the battery is above the threshold level, using the display, prompt for an input indicating whether to activate the transmitter to charge the battery.

16. The system of claim 15, further comprising a display coupled to the first controller, wherein the display is configured to display information about the location of the transmitter.

17. The system of claim 15, comprising a second controller wherein the second controller couples to the transmitter to control a release of power by the transmitter.

18. The system of claim 17, comprising a motor coupled to the transmitter, wherein the second controller is configured to control movement of the transmitter to reduce a distance between the receiver and the transmitter.

19. The system of claim 15, wherein the receiver is configured to be positioned underneath a vehicle.

20. The system of claim 15, wherein the receiver is configured to be positioned on a side of the vehicle.

* * * * *